(12) United States Patent
Kim

(10) Patent No.: US 8,743,468 B2
(45) Date of Patent: Jun. 3, 2014

(54) WIDE CONVERTER LENS

(75) Inventor: Jin-woo Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 273 days.

(21) Appl. No.: 12/874,310

(22) Filed: Sep. 2, 2010

(65) Prior Publication Data
US 2011/0085245 A1    Apr. 14, 2011

(30) Foreign Application Priority Data

Oct. 13, 2009 (KR) .................. 10-2009-0097439

(51) Int. Cl.
*G02B 15/02* (2006.01)
*G02B 13/04* (2006.01)

(52) U.S. Cl.
USPC .......................................... 359/673; 359/749

(58) Field of Classification Search
USPC .................. 359/672–674, 749–753
See application file for complete search history.

(56) References Cited

U.S. PATENT DOCUMENTS

| | | | | |
|---|---|---|---|---|
| 3,728,011 A * | 4/1973 | Mori | | 359/749 |
| 3,864,026 A * | 2/1975 | Glatzel | | 359/749 |
| 4,929,068 A * | 5/1990 | Tsuji | | 359/708 |
| 5,459,615 A * | 10/1995 | Yahagi | | 359/672 |
| 6,504,655 B2 * | 1/2003 | Shibayama | | 359/673 |
| 6,542,310 B2 * | 4/2003 | Baba | | 359/672 |
| 7,280,289 B2 * | 10/2007 | Yamakawa | | 359/771 |
| 7,286,302 B2 * | 10/2007 | Ohzawa et al. | | 359/749 |
| 7,463,424 B2 * | 12/2008 | Shinohara | | 359/673 |
| 7,551,367 B2 * | 6/2009 | Harada | | 359/689 |
| 8,068,289 B2 * | 11/2011 | Eguchi | | 359/753 |
| 2006/0087747 A1 * | 4/2006 | Ohzawa et al. | | 359/749 |
| 2008/0074761 A1 * | 3/2008 | Yamakawa et al. | | 359/794 |
| 2010/0027136 A1 * | 2/2010 | Ohashi et al. | | 359/753 |
| 2012/0026285 A1 * | 2/2012 | Yoshida et al. | | 348/36 |

FOREIGN PATENT DOCUMENTS

| | | | |
|---|---|---|---|
| CN | 1952723 A | | 4/2007 |
| JP | 8-43732 | * | 2/1996 |
| JP | 2001-272599 A | | 10/2001 |
| JP | 2005-031354 A | | 2/2005 |
| JP | 2006-084736 A | | 3/2006 |
| JP | 2006-119346 A | | 5/2006 |
| JP | 2006-235167 A | | 9/2006 |
| JP | 2006-276220 A | | 10/2006 |
| JP | 2008-026779 A | | 2/2008 |
| WO | WO 2010-001713 | * | 1/2010 |

OTHER PUBLICATIONS

Office Action issued for CN 201010509987.1 (Jan. 3, 2014).

* cited by examiner

*Primary Examiner* — Jordan Schwartz
(74) *Attorney, Agent, or Firm* — Drinker Biddle & Reath LLP

(57) ABSTRACT

A wide converter lens that is disposed on an object side of a main lens and changes the viewing angle, wherein the wide converter lens includes: a first lens having a negative refractive power, a second lens having a negative refractive power, and a third lens having a positive refractive power, wherein the first lens, the second lens, and the third lens are sequentially ordered from the object side to the image side, and the wide converter lens satisfies the following inequality:

$2vd \geq 50$ where $2vd$ is an Abbe number of the second lens.

9 Claims, 6 Drawing Sheets

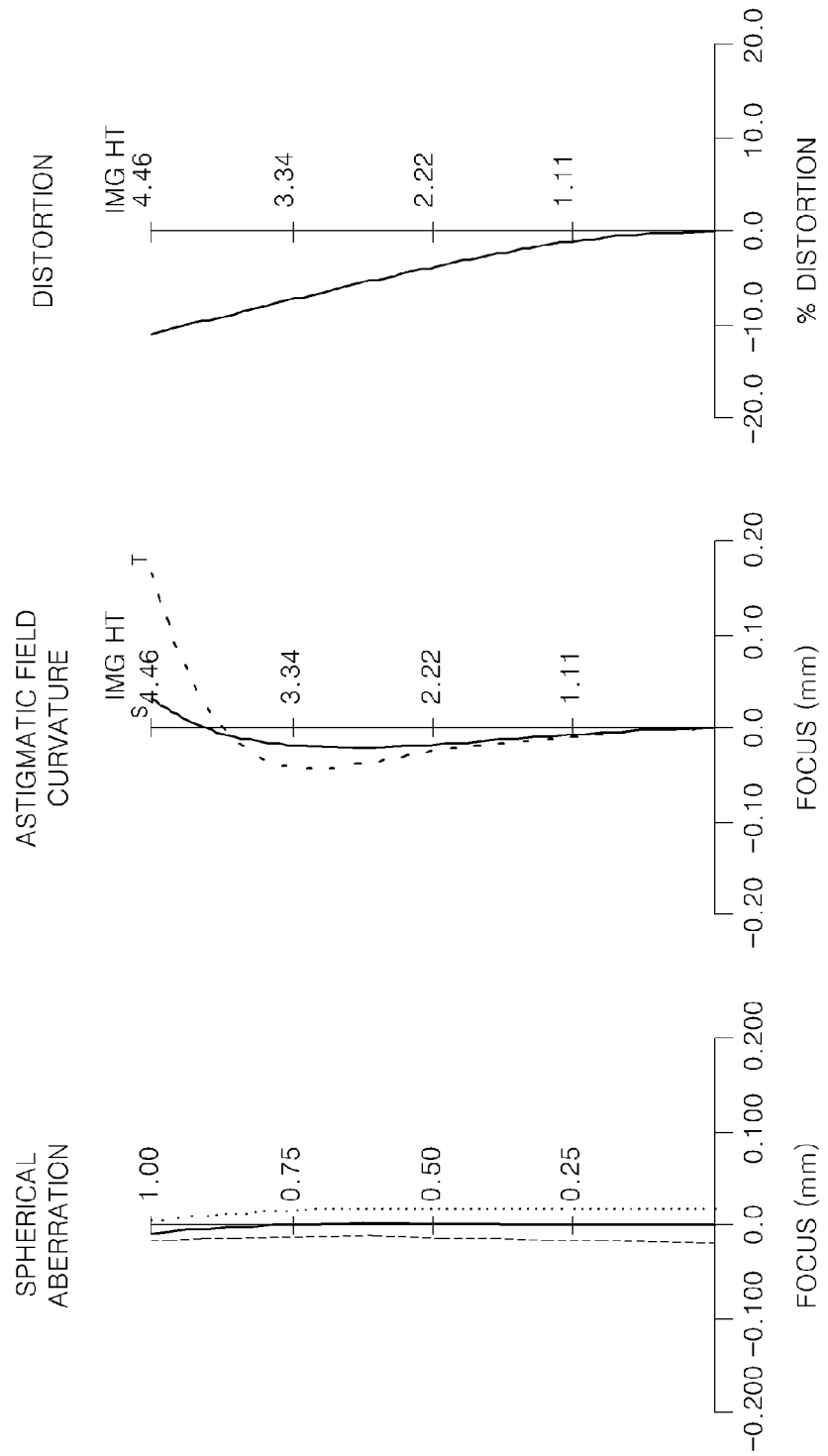

WIDE CONVERTER LENS

CROSS-REFERENCE TO RELATED PATENT APPLICATION

This application claims the benefit of Korean Patent Application No. 10-2009-0097439, filed on Oct. 13, 2009, in the Korean Intellectual Property Office, the disclosure of which is incorporated herein in its entirety by reference.

BACKGROUND OF THE INVENTION

1. Field of the Invention

The invention relates to a wide converter lens having a compact structure, and embodying a wide viewing angle by being attached to a main lens.

2. Description of the Related Art

Recently, use of optical imaging devices, such as digital still cameras or digital camcorders, including a solid-state imaging device such as a charge-coupled device (CCD) or a complementary metal-oxide semiconductor (CMOS), each of which converts an optical image into an electrical signal, is rapidly increasing.

Thus, demands for compact and lightweight optical imaging devices, in addition to optical imaging devices having high performance such as a high resolution and a wide viewing angle, are also increasing.

Since a conventional imaging lens has a limited viewing angle, wide converter lenses are used to widen the viewing angle. That is, a given viewing angle is changed by attaching a wide converter lens to a main lens. Wide converter lenses, however, have a complicated structure, and thus when used to widen the given viewing angle, distortions or aberrations may be increased.

Although various wide converter lenses have been developed, it is still difficult to obtain a wide viewing angle using a small number of lenses. For example, when the viewing angle is widened, aberrations are increased. Although such an increase in aberration of an optical imaging device can be corrected by using more lenses, the manufacturing costs, the size and the weight thereof are increased.

SUMMARY OF THE INVENTION

An embodiment of the invention provides a wide converter lens having a compact structure and enabling the viewing angle of a main lens.

According to an embodiment of the invention, there is provided a wide converter lens that is disposed on an object side of a main lens and changes a viewing angle, the wide converter lens including: a first lens having a negative refractive power, a second lens having a negative refractive power, and a third lens having a positive refractive power, wherein the first lens, the second lens, and the third lens are sequentially ordered from the object side to the image side, and the wide converter lens satisfies the following inequality:

$$2vd \geq 50$$

where $2vd$ is an Abbe number of the second lens.

The third lens may be a biconvex lens, and the radius of curvature of the third lens facing the image side may be greater than the radius of curvature of the third lens facing the object side.

The wide converter lens may satisfy the following inequality:

$$0.5 \leq (r2+r1)/(r2-r1) \leq 0.91$$

where r2 is the radius of curvature of the third lens facing the image side, and r1 is the radius of curvature of the third lens facing the object side.

The wide converter lens may satisfy the following inequality:

$$0 \leq D/1stY \leq 1$$

where D is the total thickness of the wide converter lens along the optical axis, and 1stY is an effective radius of the first lens.

Each of the first lens and the second lens may have a meniscus shape that is convex toward the object side.

The first lens, the second lens, and the third lens may be spaced apart from each other by air gaps.

The wide converter lens may satisfy the following inequality:

$$0.7 \leq WEFL/EFL \leq 0.8$$

where EFL is the focal length of the main lens, and WEFL is the combined focal length of the main lens and the wide converter lens.

According to another embodiment of the invention, there is provided an imaging lens including: the wide converter lens provided above; and a main lens that is disposed on the image side of the wide converter lens and includes at least one lens group including at least one lens.

BRIEF DESCRIPTION OF THE DRAWINGS

The above and other features and advantages of the invention will become more apparent by describing in detail exemplary embodiments thereof with reference to the attached drawings in which:

FIG. 6 illustrates aberration graphs of longitudinal spherical aberration, astigmatic field curvature, and distortion of the imaging lens including the wide converter lens of FIG. 5.

DETAILED DESCRIPTION OF THE INVENTION

Figure 1:
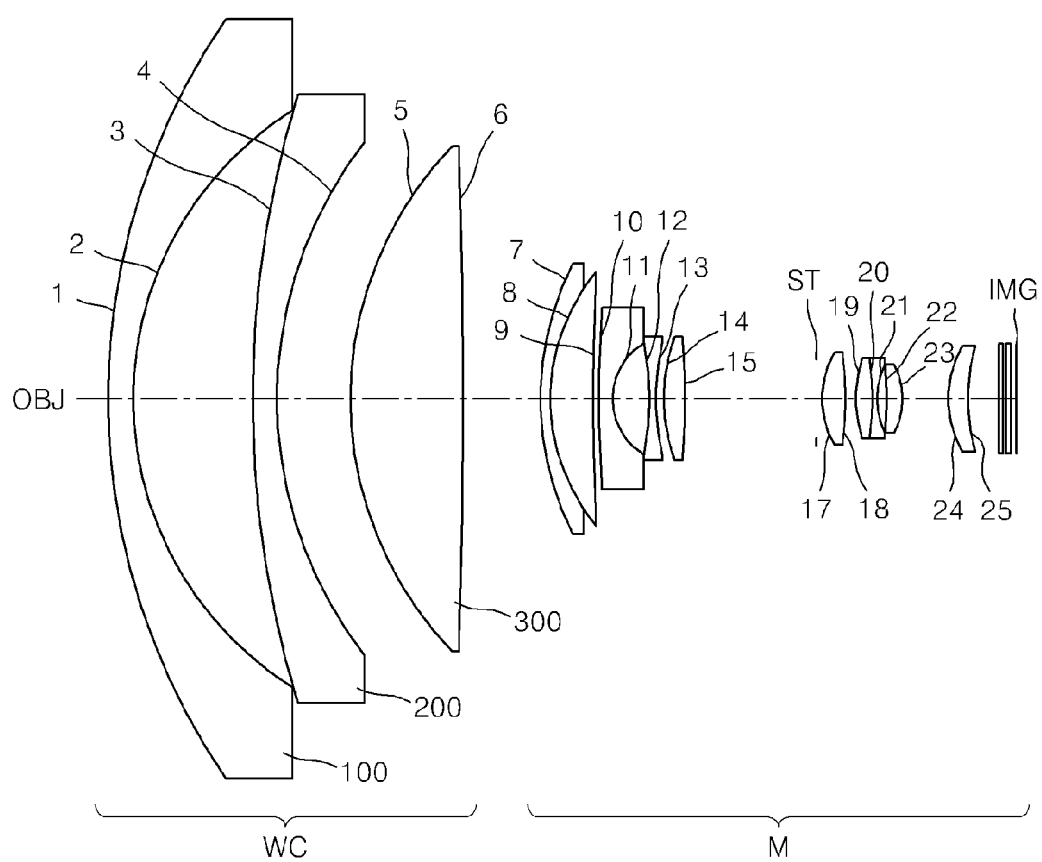
FIG. 1 illustrates an optical arrangement of an imaging lens including a wide converter lens according to an embodiment of the invention.

Reference will now be made in detail to embodiments, examples of which are illustrated in the accompanying drawings, wherein like reference numerals refer to the like elements throughout. In the drawings, the sizes of elements are exaggerated for clarity.

Figure 3:
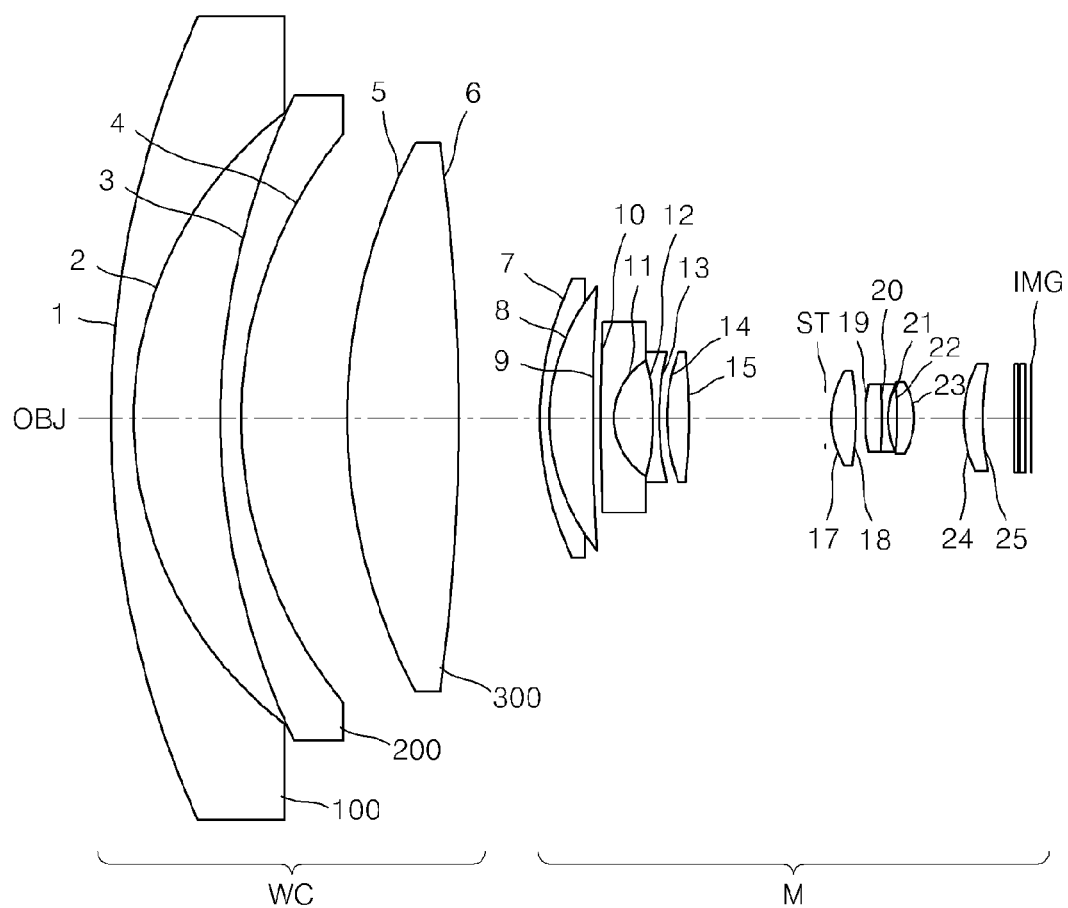
FIG. 3 illustrates an optical arrangement of an imaging lens including a wide converter lens according to another embodiment of the invention.
Figure 5:
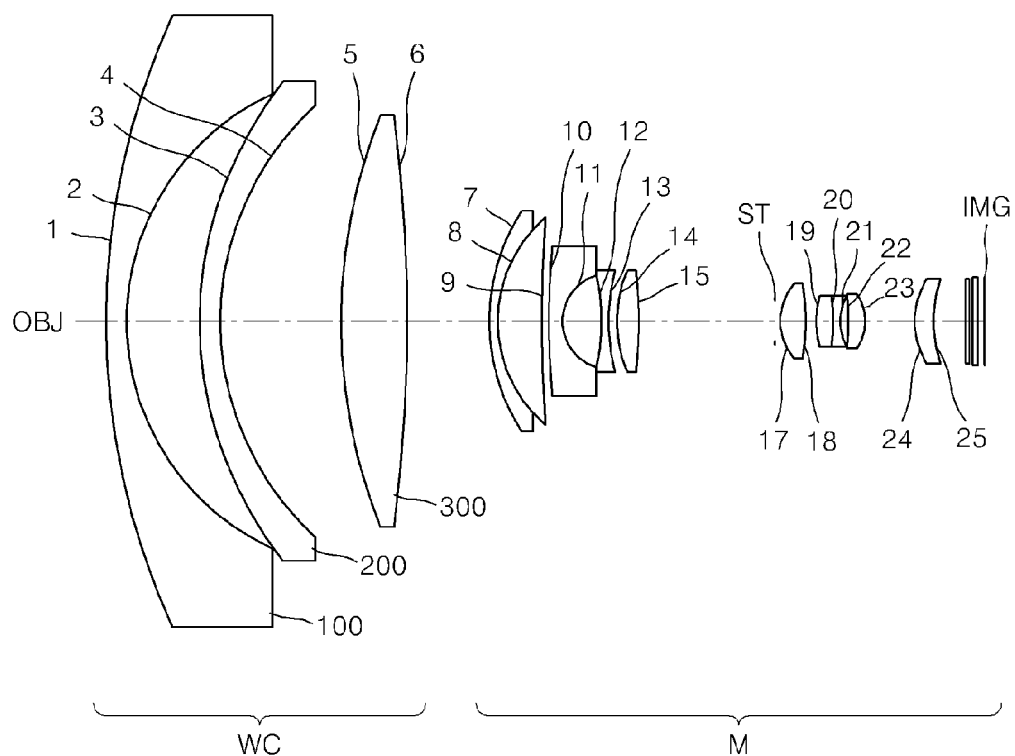
FIG. 5 illustrates an optical arrangement of an imaging lens including a wide converter lens according to another embodiment of the invention.

FIGS. 1, 3, and 5 illustrate optical arrangements of imaging lenses including a wide converter lens, according to embodiments of the invention. Referring to FIGS. 1, 3, and 5, each of the imaging lenses includes a main lens M and a wide converter lens WC disposed on an object OBJ side of the main lens M. An infrared filter and a cover glass may be disposed on an image IMG surface side of the main lens M. The image IMG surface may be an image surface of an imaging device such as a charge coupled device (CCD) or a complementary metal-oxide semiconductor (CMOS). The main lens M is a lens that forms an image of a subject on the image IMG surface, and may include at least one lens group each including at least one lens. The structures of the main lens M illustrated in FIGS. 1, 3, and 5 are exemplary and the main lens M is not limited thereto.

The wide converter lens WC includes a first lens 100 having a negative refractive power, a second lens 200 having a negative refractive power, and a third lens 300 having a positive refractive power, wherein the first lens 100, the second lens 200, and the third lens 300 are sequentially disposed from the object OBJ side to the image IMG surface side. The first lens 100, the second lens 200, and the third lens 300 are spaced apart from each other by air gaps. Each of the first lens 100 and the second lens 200 has a meniscus shape that is convex toward the object OBJ side. Such a structure enables incident light to be smoothly refracted during widening of a viewing angle, and has low sensitivity of performance change due to lens assembly errors.

The third lens 300 may be a biconvex lens, and the radius of curvature of the third lens 300 facing the image IMG surface side may be greater than the radius of curvature of the third lens 300 facing the object OBJ side.

Wide converter lenses WC according to embodiments of the invention embody wide viewing angles and prevent a decrease in resolution due to an increase in aberration.

Each of the wide converter lenses WC according to embodiments of the invention satisfies the following inequality:

$$2vd \geq 50 \quad \text{Inequality 1}$$

where 2vd is an Abbe number of the second lens 200.

When the second lens 200, which is a negative lens, includes a material having an Abbe number of 50 or more, an increase in chromatic aberration that occurs during widening may be reduced.

Each of the wide converter lenses WC according to embodiments of the invention may satisfy the following inequality:

$$0.5 \leq (r2+r1)/(r2-r1) \leq 0.91 \quad \text{Inequality 2}$$

where r2 is the radius of curvature of the third lens 300 facing the image IMG surface side, and r1 is the radius of curvature of the third lens 300 facing the object OBJ side.

The shape of the third lens 300 is defined by Inequality 2. Within this range, the radius of curvature of the third lens 300 facing the image IMG surface side may be greater than that facing the object OBJ side, and thus, eccentricity may be less likely to occur when the wide converter lenses WC according to embodiments of the invention are assembled.

Each of the wide converter lenses WC according to embodiments of the invention may satisfy the following inequality:

$$0 < D/1stY \leq 1 \quad \text{Inequality 3}$$

where D is the total thickness of the wide converter lens WC along an optical axis, and 1stY is an effective radius of the first lens 100.

The total thickness of the wide converter lens WC along the optical axis is defined with respect to the effective radius of the first lens 100 by Inequality 3. When D/1stY satisifes Inequality 3, a compact imaging lens may be obtained.

Each of the wide converter lenses WC according to embodiments of the invention may satisfy the following inequality:

$$0.7 \leq WEFL/EFL \leq 0.8 \quad \text{Inequality 4}$$

where EFL is the focal length of the main lens M, and WEFL is the combined focal length of the main lens M and the wide converter lens WC, that is, the total focal length of the imaging lens including the wide converter lens WC.

A degree that the viewing angle is changed by the wide converter lens WC is defined by Inequality 4, and if WEFL/EFL is greater than the upper limit, the widening effect may be negligible, and if WEFL/EFL is less than the lower limit, aberrations may occur due to the widening and thus more lenses are needed for correction, which is an obstacle for compacting.

Hereinafter, data of imaging lenses including wide converter lenses according to embodiments of the invention will be presented. In embodiments of the invention, an aspherical surface is defined by the following equation.

$$x = \frac{c'y^2}{1+\sqrt{1-(K+1)c'^2 y^2}} + Ay^4 + By^6 + Cy^8 + Dy^{10} \quad \text{Equation 5}$$

where x is a distance from the vertex of a lens in an optical axis direction, y is the distance in a direction perpendicular to the optical axis, K is a conic constant, A, B, C, and D are aspherical coefficients, and c' is a reciprocal of the radius of curvature at the vertex of the lens, that is, 1/R.

Hereinafter, EFL refers to a combined focal length of an imaging lens, FNO refers to an F number, * written to the side of a lens surface number denotes an aspherical surface, and ST refers to a diaphragm.

<First Embodiment>

Figure 2:
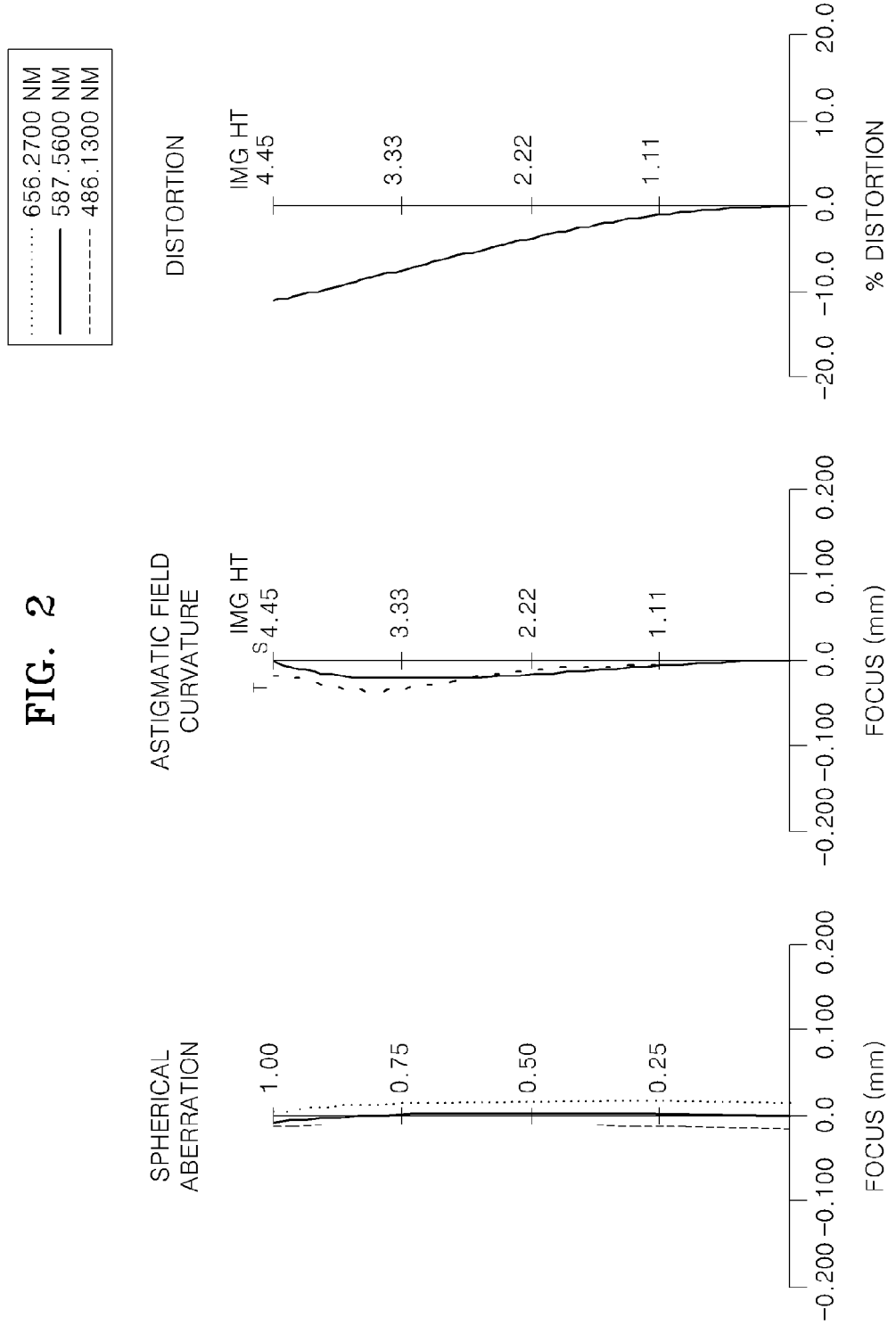
FIG. 2 illustrates aberration graphs of longitudinal spherical aberration, astigmatic field curvature, and distortion of the imaging lens including the wide converter lens of FIG. 1.

FIG. 1 illustrates an optical arrangement of an imaging lens including a wide converter lens according to an embodiment of the invention, and FIG. 2 illustrates aberration graphs of longitudinal spherical aberration, astigmatic field curvature, and distortion of the imaging lens including the wide converter lens of FIG. 1. Referring to FIG. 2, the graphs of spherical aberration are with respect to c line representing a wavelength of 656.27 nm, d line representing a wavelength of 587.56 nm, and f line representing a wavelength of 486.13 nm. The graphs of the astigmatic field curvature include a tangential field curvature (T) and a sagittal field curvature (S).

Lens data of the imaging lens according to the present embodiment is as follows.

EFL: 4.105 mm, FNO: 2.81, and viewing angle: 101.3°

| Surface | Radius of Curvature (R) | Thickness (D) | Refractive Index (nd) | Abbe number (vd) |
|---------|-------------------------|---------------|-----------------------|------------------|
| 1       | 66.558                  | 2.40          | 1.834                 | 37.4             |
| 2       | 33.632                  | 11.80         |                       |                  |
| 3       | 101.553                 | 2.4           | 1.713                 | 53.9             |
| 4       | 41.095                  | 7.2           |                       |                  |
| 5       | 35.893                  | 11.2          | 1.620                 | 36.3             |
| 6       | −743.061                | 7.80          |                       |                  |
| 7       | 30.553                  | 0.90          | 1.923                 | 20.8             |
| 8       | 19.879                  | 4.12          | 1.883                 | 40.8             |
| 9       | 149.576                 | 0.74          |                       |                  |
| 10*     | 199.982                 | 1.25          | 1.805                 | 40.9             |
| 11*     | 6.170                   | 3.80          |                       |                  |
| 12      | −27.391                 | 0.60          | 1.883                 | 40.8             |

-continued

| Surface | Radius of Curvature (R) | Thickness (D) | Refractive Index (nd) | Abbe number (vd) |
|---|---|---|---|---|
| 13 | 27.391 | 0.78 | | |
| 14 | 18.959 | 2.06 | 1.923 | 20.8 |
| 15 | −79.126 | 13.03 | | |
| ST | infinity | 0.50 | | |
| 17* | 8.306 | 2.40 | 1.740 | 49.0 |
| 18* | −23.519 | 0.99 | | |
| 19 | 15.081 | 1.6 | 1.487 | 70.4 |
| 20 | −28.768 | 0.50 | 1.847 | 23.7 |
| 21 | 6.998 | 0.94 | | |
| 22 | −28.108 | 1.55 | 1.497 | 81.6 |
| 23 | −7.455 | 3.70 | | |
| 24* | 11.079 | 1.90 | 1.805 | 40.9 |
| 25* | 20.770 | 4.00 | | |
| 26 | infinity | 0.30 | 1.517 | 64.1 |
| 27 | infinity | 0.30 | | |
| 28 | infinity | 0.50 | 1.517 | 64.1 |
| 29 | infinity | 0.60 | | |

<Aspherical Coefficient>

| Surface | K | A | B | C | D |
|---|---|---|---|---|---|
| 10 | 1.000000 | 5.453286E−05 | −1.446562E−06 | 1.340401E−08 | −4.558549E−11 |
| 11 | −0.252682 | 4.300082E−05 | 1.174841E−06 | −9.883407E−08 | −7.696357E−10 |
| 17 | −0.168485 | −1.546457E−04 | 2.409356E−06 | −4.319453E−08 | 0.000000E+00 |
| 18 | −0.234634 | 2.984024E−04 | 2.967020E−07 | −2.766867E−08 | 0.000000E+00 |
| 24 | 0.145844 | −7.035462E−05 | 2.048205E−06 | −2.053240E−08 | 0.000000E+00 |
| 25 | −0.912171 | −1.587416E−05 | 1.665169E−06 | −1.645959E−08 | 0.000000E+00 |

<Second Embodiment>

Figure 4:
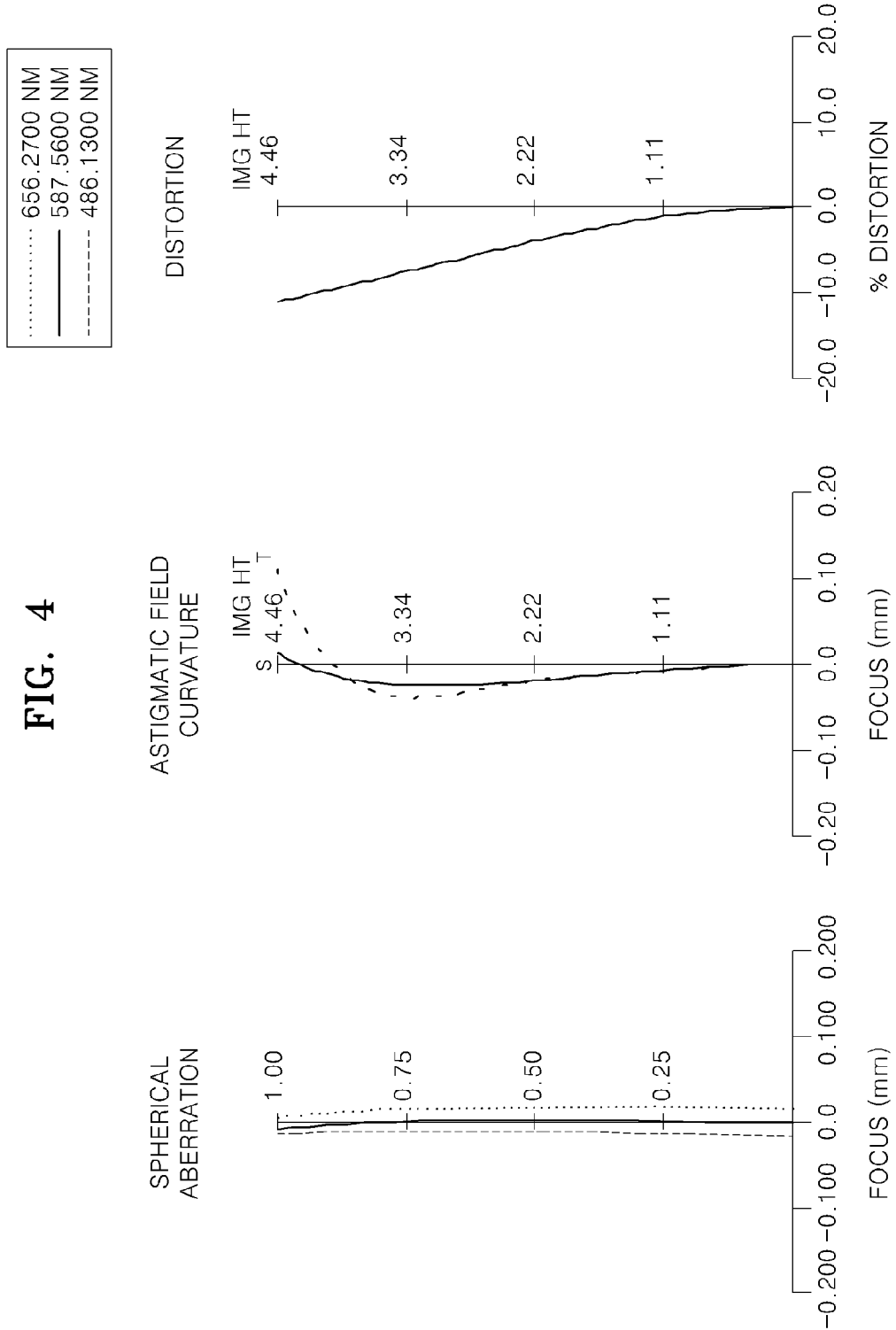
FIG. 4 illustrates aberration graphs of longitudinal spherical aberration, astigmatic field curvature, and distortion of the imaging lens including the wide converter lens of FIG. 3.

FIG. 3 illustrates an optical arrangement of an imaging lens including a wide converter lens according to another embodiment of the invention, and FIG. 4 illustrates aberration graphs of longitudinal spherical aberration, astigmatic field curvature, and distortion of the imaging lens including the wide converter lens of FIG. 3. Referring to FIG. 4, the graphs of spherical aberration are with respect to c line representing a wavelength of 656.27 nm, d line representing a wavelength of 587.56 nm, and f line representing a wavelength of 486.13 nm, and the graphs of astigmatic field curvature includes a tangential field curvature (T) and a sagittal field curvature (S).

Lens data of the imaging lens according to the present embodiment is as follows.

| Surface | Radius of Curvature (R) | Thickness (D) | Refractive Index (nd) | Abbe number (vd) |
|---|---|---|---|---|
| 1 | 93.828 | 2.00 | 1.860 | 41.8 |
| 2 | 36.915 | 8.41 | | |
| 3 | 71.260 | 2.0 | 1.497 | 81.6 |
| 4 | 43.102 | 10.1 | | |
| 5 | 55.827 | 10.7 | 1.636 | 33.1 |
| 6 | −192.293 | 7.80 | | |
| 7 | 30.553 | 0.90 | 1.923 | 20.8 |
| 8 | 19.879 | 4.12 | 1.883 | 40.8 |
| 9 | 149.576 | 0.74 | | |
| 10* | 199.982 | 1.25 | 1.805 | 40.9 |
| 11* | 6.170 | 3.80 | | |
| 12 | −27.391 | 0.60 | 1.883 | 40.8 |
| 13 | 27.391 | 0.78 | | |
| 14 | 18.959 | 2.06 | 1.923 | 20.8 |
| 15 | −79.126 | 13.03 | | |
| ST | infinity | 0.50 | | |
| 17* | 8.306 | 2.40 | 1.740 | 49.0 |
| 18* | −23.519 | 0.99 | | |
| 19 | 15.081 | 1.6 | 1.487 | 70.4 |
| 20 | −28.768 | 0.50 | 1.847 | 23.7 |
| 21 | 6.998 | 0.94 | | |
| 22 | −28.108 | 1.55 | 1.497 | 81.6 |
| 23 | −7.455 | 3.70 | | |
| 24* | 11.079 | 1.90 | 1.805 | 40.9 |
| 25* | 20.770 | 4.00 | | |
| 26 | infinity | 0.30 | 1.517 | 64.1 |
| 27 | infinity | 0.30 | | |
| 28 | infinity | 0.50 | 1.517 | 64.1 |
| 29 | infinity | 0.60 | | |

<Aspherical Coefficient>

| Surface | K | A | B | C | D |
|---|---|---|---|---|---|
| 8 | 1.000000 | 5.453286E−05 | −1.446562E−06 | 1.340401E−08 | −4.558549E−11 |
| 9 | −0.252682 | 4.300082E−05 | 1.174841E−06 | −9.883407E−08 | −7.696357E−10 |
| 15 | −0.168485 | −1.546457E−04 | 2.409356E−06 | −4.319453E−08 | 0.000000E+00 |
| 16 | −0.234634 | 2.984024E−04 | 2.967020E−07 | −2.766867E−08 | 0.000000E+00 |
| 22 | 0.145844 | −7.035462E−05 | 2.048205E−06 | −2.053240E−08 | 0.000000E+00 |
| 23 | −0.912171 | −1.587416E−05 | 1.665169E−06 | −1.645959E−08 | 0.000000E+00 |

<Third Embodiment>

FIG. 5 illustrates an optical arrangement of an imaging lens including a wide converter lens according to another embodiment of the invention, and FIG. 6 illustrates aberration graphs of longitudinal spherical aberration, astigmatic field curvature, and distortion of the imaging lens including the wide converter lens of FIG. 5. Referring to FIG. 6, the graphs of spherical aberration are with respect to c line representing a wavelength of 656.27 nm, d line representing a wavelength of 587.56 nm, and f line representing a wavelength of 486.13 nm, and the graphs of the astigmatic field curvature includes a tangential field curvature (T) and a sagittal field curvature (S).

Lens data of the imaging lens according to the present embodiment is as follows.

| Surface | Radius of Curvature (R) | Thickness (D) | Refractive Index (nd) | Abbe number (vd) |
|---|---|---|---|---|
| 1 | 110.781 | 2.00 | 1.713 | 30.5 |
| 2 | 34.372 | 6.86 | | |
| 3 | 56.784 | 2.0 | 1.629 | 53.1 |
| 4 | 42.650 | 11.5 | | |
| 5 | 85.798 | 6.3 | 1.916 | 22.9 |
| 6 | −257.264 | 7.80 | | |
| 7 | 30.553 | 0.90 | 1.923 | 20.8 |
| 8 | 19.879 | 4.12 | 1.883 | 40.8 |
| 9 | 149.576 | 0.74 | | |
| 10* | 199.982 | 1.25 | 1.805 | 40.9 |
| 11* | 6.170 | 3.8 | | |
| 12 | −27.391 | 0.60 | 1.883 | 40.8 |
| 13 | 27.391 | 0.78 | | |
| 14 | 18.959 | 2.06 | 1.923 | 20.8 |
| 15 | −79.126 | 13.03 | | |
| ST | infinity | 0.50 | | |
| 17* | 8.306 | 2.40 | 1.740 | 49.0 |
| 18* | −23.519 | 0.99 | | |
| 19 | 15.081 | 1.6 | 1.487 | 70.4 |
| 20 | −28.768 | 0.50 | 1.847 | 23.7 |
| 21 | 6.998 | 0.942 | | |
| 22 | −28.108 | 1.55 | 1.497 | 81.6 |
| 23 | −7.455 | 3.7 | | |
| 24* | 11.079 | 1.9 | 1.805 | 40.9 |
| 25* | 20.770 | 4.0 | | |
| 26 | infinity | 0.3 | 1.517 | 64.1 |
| 27 | infinity | 0.30 | | |
| 28 | infinity | 0.50 | 1.517 | 64.1 |
| 29 | infinity | 0.60 | | |

<Aspherical Coefficient>

| Surface | K | A | B | C | D |
|---|---|---|---|---|---|
| 8 | 1.000000 | 5.453286E−05 | −1.446562E−06 | 1.340401E−08 | −4.558549E−11 |
| 9 | −0.252682 | 4.300082E−05 | 1.174841E−06 | −9.883407E−08 | −7.696357E−10 |
| 15 | −0.168485 | −1.546457E−04 | 2.409356E−06 | −4.319453E−08 | 0.000000E+00 |
| 16 | −0.234634 | 2.984024E−04 | 2.967020E−07 | −2.766867E−08 | 0.000000E+00 |
| 22 | 0.145844 | −7.035462E−05 | 2.048205E−06 | −2.053240E−08 | 0.000000E+00 |
| 23 | −0.912171 | −1.587416E−05 | 1.665169E−06 | −1.645959E−08 | 0.000000E+00 |

The following table shows that the zoom lenses according to embodiments described above satisfy Inequalities 1 through 4.

| Conditions | First Embodiment | Second Embodiment | Third Embodiment |
|---|---|---|---|
| 1 2vd | 53.9 | 81.6 | 53.1 |
| 2 (r2 + r1)/(r2 − r1) | 0.908 | 0.550 | 0.500 |
| 3 D/1stY | 0.977 | 0.908 | 0.800 |
| 4 WEFL/EFL | 0.765 | 0.755 | 0.765 |

As described above, wide converter lenses according to the embodiments described above are suitable for compact and thin structure and reduce aberrations that occur when a viewing angle is changed. Imaging lenses including the wide converter lenses have a wide viewing angle.

While the invention has been particularly shown and described with reference to exemplary embodiments thereof, it will be understood by those of ordinary skill in the art that various changes in form and details may be made therein without departing from the spirit and scope of the invention as defined by the following claims.

What is claimed is:

1. A wide converter lens that is disposed on an object side of a main lens and changes the viewing angle, the wide converter lens comprising:
a first lens having a negative refractive power,
a second lens having a negative refractive power, and
a third lens having a positive refractive power,
wherein the first lens, the second lens, and the third lens are sequentially ordered from the object side to the image side, and the wide converter lens satisfies the following inequality:

$$2vd \geq 50$$

where 2vd is an Abbe number of the second lens;
wherein the wide converter lens satisfies the following inequality:

$$0 < D/1stY \leq 1$$

where D is the total thickness of the wide converter lens along an optical axis, and 1stY is an effective radius of the first lens; and
wherein the wide converter lens satisfies the following inequality:

$$0.7 \leq WEFL/EFL \leq 0.8$$

where EFL is the focal length of the main lens, and WEFL is the combined focal length of the main lens and the wide converter lens.

2. The wide converter lens of claim 1, wherein the third lens is a biconvex lens, and the absolute value of the radius of curvature of the third lens facing the image side is greater than the absolute value of the radius of curvature of the third lens facing the object side.

3. The wide converter lens of claim 2, wherein the wide converter lens satisfies the following inequality:

$$0.5 \leq (r2+r1)/(r2-r1) \leq 0.91$$

where r2 is the radius of curvature of the third lens facing the image side, and r1 is the radius of curvature of the third lens facing the object side.

4. The wide converter lens of claim 1, wherein each of the first lens and the second lens has a meniscus shape that is convex toward the object side.

5. The wide converter lens of claim 1, wherein the first lens, the second lens, and the third lens are spaced apart from each other by air gaps.

6. An imaging lens comprising:
the wide converter lens of claim 1; and
a main lens that is disposed on the image side of the wide converter lens and comprises at least one lens group comprising at least one lens.

7. The imaging lens of claim 6, wherein each of the first lens and the second lens has a meniscus shape that is convex toward the object side.

8. The imaging lens of claim 7, wherein the first lens, the second lens, and the third lens are spaced apart from each other by air gaps.

9. An imaging lens comprising:
a wide converter lens that is disposed on an object side of a main lens and changes the viewing angle, the wide converter lens comprising:
a first lens having a negative refractive power,
a second lens having a negative refractive power, and
a third lens having a positive refractive power,
wherein the first lens, the second lens, and the third lens are sequentially ordered from the object side to the image side, and the wide converter lens satisfies the following inequality:

$2vd \geq 50$ where 2vd is an Abbe number of the second lens; and wherein the wide converter lens satisfies the following inequality:

$0 < D/1stY \leq 1$ where D is the total thickness of the wide converter lens along an optical axis, and 1stY is an effective radius of the first lens; and a main lens that is disposed on the image side of the wide converter lens and comprises at least one lens group comprising at least one lens, wherein the imaging lens satisfies the following inequality:

$0.7 \leq WEFL/EFL \leq 0.8$ where EFL is the focal distance of the main lens, and WEFL is the focal distance of the imaging lens.

* * * * *